(12) United States Patent
Krishnamurthy

(10) Patent No.: US 10,650,112 B1
(45) Date of Patent: May 12, 2020

(54) MULTI-BIT CLOCK GATING CELL TO REDUCE CLOCK POWER

(71) Applicant: Apple Inc., Cupertino, CA (US)

(72) Inventor: Harsha Krishnamurthy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 15/851,134

(22) Filed: Dec. 21, 2017

(51) Int. Cl.
  *G06F 17/50* (2006.01)
  *H03K 3/037* (2006.01)
  *H03K 3/012* (2006.01)
  *G06F 1/10* (2006.01)

(52) U.S. Cl.
  CPC ...... *G06F 17/5072* (2013.01); *G06F 17/5077* (2013.01); *H03K 3/012* (2013.01); *H03K 3/037* (2013.01); *G06F 1/10* (2013.01); *G06F 2217/62* (2013.01); *G06F 2217/78* (2013.01)

(58) Field of Classification Search
  CPC .................................................. G06F 17/5072
  USPC ....................................................... 716/120
  See application file for complete search history.

(56) References Cited

U.S. PATENT DOCUMENTS

| | | | |
|---|---|---|---|
| 7,779,372 B2 | 8/2010 | Campbell et al. | |
| 8,341,578 B2 | 12/2012 | Campbell et al. | |
| 8,671,380 B2 | 3/2014 | Wang et al. | |
| 9,081,517 B2 | 7/2015 | Koniaris et al. | |
| 9,660,620 B1 | 5/2017 | Zyuban et al. | |
| 2002/0152409 A1* | 10/2002 | Chu | G06F 17/505 713/320 |
| 2016/0072483 A1* | 3/2016 | Ikenishi | H03K 3/0372 327/202 |
| 2017/0302277 A1* | 10/2017 | Ge | G06F 1/06 |

* cited by examiner

*Primary Examiner* — Suchin Parihar
(74) *Attorney, Agent, or Firm* — Kowert Hood Munyon Rankin and Goetzel PC; Rory D. Rankin

(57) ABSTRACT

Systems, apparatuses, and methods for efficiently implementing clock gating circuitry. A multi-bit clock gating cell is placed on the die of an integrated circuit and replaces at least two single-bit clock gating cells that were to be placed on the die. Each single-bit clock gating cell receives a single clock enable signal and generates a single gated clock signal. Each multi-bit clock gating cell receives multiple clock enable signals and generates multiple gated clock signals based on a single common received clock signal. Conditions for determining whether two or more single-bit clock gating cells are replaced by a multi-bit clock gating cell include a distance between two single-bit clock gating cells, a load driven by any one of the two single-bit clock gating cells and an activity level of a common single clock received by at least two single-bit clock gating cells is above a respective threshold.

20 Claims, 7 Drawing Sheets

*Clock Tree Hierarchy 300*

*Single-bit clock gater 310*

*Sequential Element 320*

MULTI-BIT CLOCK GATING CELL TO REDUCE CLOCK POWER

BACKGROUND

Technical Field

Embodiments described herein relate to the field of processors and, more particularly, to efficiently gating clock signals for processing elements.

Description of the Related Art

A computing system such as a semiconductor chip includes multiple functional blocks or units, each capable of processing data. In various embodiments, the multiple functional units are individual dies on one of a system on a chip (SOC), a multi-chip module (MCM), or a printed circuit board. Examples of functional units are general-purpose processors with one or more cores in a central processing unit (CPU), highly parallel data architected processors with one or more cores in graphics processing units (GPUs) and digital signal processors (DSPs), display controllers, audio processing components, networking components, peripheral interface controllers, memory controllers, and so on.

Control logic, such as a power management unit, within the computing system determines one or more operating states for the different functional units. The operating state includes a power supply voltage and an operational clock frequency. Clock generating circuitry generates different clock signals at the one or more specified different frequencies, whereas a power distribution network provides the one or more specified different power supply voltages. The power consumption of semiconductor chips is also based on other parameters such as the switching of nodes on the chip and the load capacitance. The one or more clock tree hierarchies on the semiconductor chip includes an appreciable amount of both switching nodes and load capacitance. Techniques to improve signal integrity and reduce power consumption on clock signals, such as increased spacing and the use of shielding, consumes an appreciable amount of on-die area, which increases routing congestion.

In view of the above, methods and mechanisms for efficiently gating clock signals for processing elements are desired.

SUMMARY

Systems, apparatuses, and methods for efficiently implementing clock gating circuitry are contemplated. An integrated circuit includes a clock distribution network (or clock tree) for distributing clock signals from a common location of a clock generator to a variety of sequential elements across the die of the integrated circuit. The clock signals are distributed across the die while reducing clock skew, clock jitter, and clock duty cycle distortion in addition to preventing race conditions. Examples of clock trees are H-trees, Fish-bone-trees, Y-trees, matched resistor-capacitor (RC) trees, a combination of clock tree structures based on the region of the floorplan, and so forth.

Examples of sequential elements are flip-flop circuits, latch circuits, write wordline driver circuits, read wordline driver circuits, and so forth, and each receives a clock signal at a respective level of the multiple levels in the clock tree hierarchy. The clock signals are conditionally enabled at one or more levels of the multiple levels of the clock tree hierarchy. In various embodiments, the layout of the integrated circuit includes multiple regions. Each region uses one or more levels of the clock tree hierarchy. During operation of the integrated circuit, the power management unit is capable of selecting between states such as an active state, an idle state, a sleep state, and so on, for one or more regions, and thus, enable or disable use of the corresponding regions of the integrated circuit. In various embodiments, an enable signal is used to enable or disable clock signals.

The clock tree hierarchy includes clock gating cells for conditionally enabling the clock signals. Clock gating cells receive a clock signal to be conditionally enabled. Clock gating cells include a sequential element for receiving both a clock enable signal and a buffered version of the clock signal to be conditionally enabled. The buffered version may be an inverted value of the received clock signal. A Boolean logic gate in the clock gating cell combines the output of the sequential element and the received clock signal to be conditionally enabled. In various embodiments, the clock tree hierarchy includes one or more single-bit clock gating cells and one or more multi-bit clock gating cells. Each of the single-bit clock gating cells receives a single clock enable signal and generates a single gated clock signal. Each of the multi-bit clock gating cells receives multiple clock enable signals and generates multiple gated clock signals based on a single common received clock signal.

In various embodiments, a multi-bit clock gating cell is placed on the die and replaces two or more single-bit clock gating cells that were to be placed on the die. The two or more single-bit clock gating cells may have been selected during either pre-clock tree synthesis (pre-CTS) or post-CTS. Each of the two single-bit clock gating cells receives a common clock signal. A software clock tree synthesis tool, a chip designer, or other determines a distance between the two single-bit clock gating cells and compares the distance to the distance threshold. If the distance between the two single-bit clock gating cells is below the distance threshold, then the two single-bit clock gating cells are replaced with the multi-bit clock gating cell, which is placed on the die. The number of single-bit clock gating cells replaced by the multi-bit clock gating cell also determines the number of gated clock signals generated by the multi-bit clock gating cell. Any number of single-bit clock gating cells may be replaced by a multi-bit clock gating cell and may depend on design choice and design time for supporting a library using multi-bit clock gating cells.

In some embodiments, other conditions are used to determine whether two or more single-bit clock gating cells are replaced by a multi-bit clock gating cell in the floorplan. For example, in an embodiment, a switching activity level of the common single clock received by two or more single-bit clock gating cells is estimated. It is determined whether the estimated switching activity level is greater than a switching activity threshold to qualify replacement of the two or more single-bit clock gating cells. In some embodiments, the switching activity threshold is stored in a programmable control register. In an embodiment, the switching activity threshold is set to identify a particular percentage switching activity levels of all clock nets on the die.

In one embodiment, a load driven by a single-bit clock gating cell is estimated and determined whether it is below a load threshold to qualify replacement of the single-bit clock gating cell. When performed pre-CTS, one or more of the single-bit clock gating cells may be later cloned to reduce a relatively high load to be driven. If the load threshold used for determining whether to clone is known, then the load threshold used for determining whether to replace single-bit clock gating cells with multi-bit clock gating cells are adjusted accordingly. In another embodiment, single-bit clock gating cells identified for cloning are removed as candidates for being replaced by multi-bit clock gating cells. In yet other embodiments, determining whether to replace single-bit clock gating cells with multi-bit clock gating cells is performed only during post-CTS steps.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
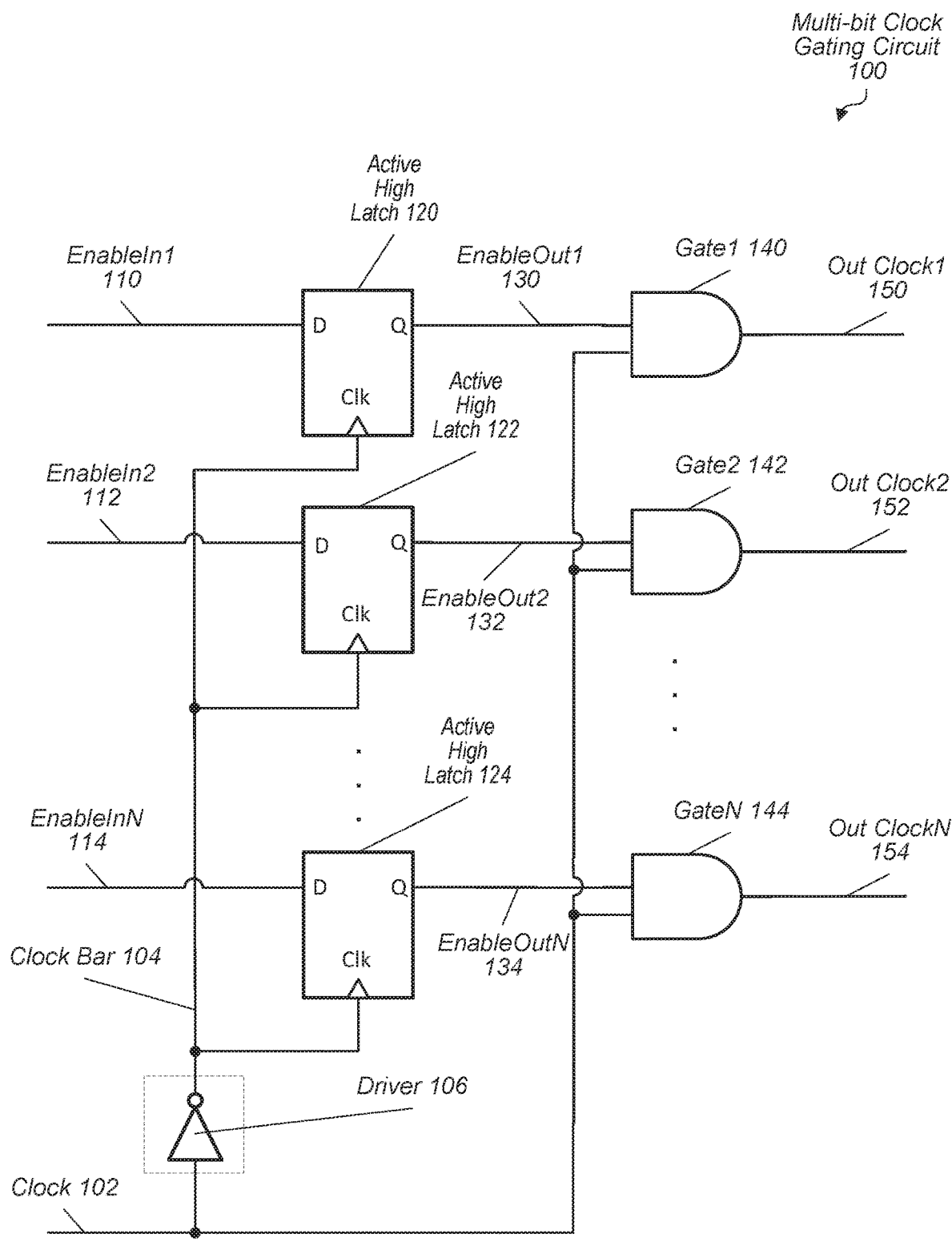
FIG. 1 is a block diagram illustrating one embodiment of a multi-bit clock gating circuit.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a generalized block diagram illustrating one embodiment of multi-bit clock gating circuit 100 is shown. In various embodiments, the multi-bit clock gating circuit 100 is used across the die of an integrated circuit. In some embodiments, the multi-bit clock gating circuit 100 is used in any level of a multi-level clock tree hierarchy. The multi-bit clock gating circuit 100 includes multiple sequential elements for receiving both a buffered version of a common clock signal, which is to be conditionally enabled, and multiple clock enable signals. Combinatorial logic, such as Boolean logic gates, are used to combine the outputs of the sequential elements with the received common single clock signal, which is conditionally enabled.

As shown, circuit 100 includes circuitry configured to receive a single input clock signal 102. In the example, shown clock driver 106 receives the single input clock signal 102 and generates a shared intermediate clock signal indicated as clock bar 104 based on the received clock signal 102. In the illustrated embodiment, the shared intermediate clock signal 104 is an inverted value of the received common clock signal 102. Clock signal 102 is one of multiple clock signals generated by a clock tree. Multiple clock signals are distributed across the die of the integrated circuit by the clock tree while reducing clock skew, clock jitter, and clock duty cycle distortion in addition to preventing race conditions. Examples of clock trees are H-trees, Fish-bone-trees, Y-trees, matched resistor-capacitor (RC) trees, a combination of clock tree structures based on the clock loading in a particular region of the floorplan, and so forth.

In the illustrated embodiment, the sequential elements in multi-bit clock gating circuit 100 are active high latches 120, 122 and 124. In such an embodiment, latches 120, 122 and 124 are configured to latch the values of the received enable signal when the clock input to the latch is high (e.g., has a voltage level above a given threshold). Alternatively, in other embodiments, those skilled in the art will appreciate that active low latches may be used which are configured to latch the value of the enable signal when the clock signal is low (e.g., has a voltage level below a given threshold). In an embodiment in which the latches are active low, the received clock signal 102 may be conveyed to the clock input of the latches without inversion and the driver 106 may be removed. Although three latches are shown, any number of sequential elements are used in other embodiments based on design choice. As shown, each of the latches 120-124 receives the shared intermediate clock signal 104. As shown, latch 120 also receives the clock enable signal EnableIn1 110 on its data input. Similarly, latch 122 receives the clock enable signal EnableIn2 112 on its data input, and latch 124 receives the clock enable signal EnableInN 114 on its data input. In an embodiment, each of the clock enable signals 110-114 is generated by an external power management unit. In order to reduce power consumption, one or more operating parameters are reduced. In some embodiments, the power management unit receives information from on-die sensors and activity monitors, and generates control signals to change operating parameters and conditions for the integrated circuit.

In various embodiments, the power management unit uses power-performance states (P-states) to set the operational frequency and operational voltage of the integrated circuit while attempting to balance performance and power consumption. In addition to using P-states, in various embodiments, the power management unit uses one or more core states (C-states), such as an active state, an idle state, and a sleep state, to control operation of the integrated circuit and balance performance and power consumption. The use of C-states alternates between turning on and disabling clock signals at one or more levels of the multi-level clock tree hierarchy. In addition to the above states, in various embodiments, alternating between turning on and disabling clock signals is performed for functional reasons. In one example, a given clock gating circuit controls a clock signal for a sequential element used to store a state of a particular status bit in a given entry of a register file. In an embodiment, if an address or other identifier of a write/update operation points to the given entry in the register file, then the given clock gating circuit receives an asserted enable signal. Therefore, the given clock gating circuit conveys a clock signal to allow an update of the particular status bit to proceed. Otherwise, the given clock gating circuit receives a negated enable signal and the given clock gating circuit prevents the clock signal from being conveyed.

In the embodiment of FIG. 1, the control signals EnableIn1 110, EnableIn2 112, and EnableInN 114 are examples of control signals used to gate particular clock signals. As used herein, to "gate" a particular clock signal refers to enabling or disabling the particular clock signal. In various embodiments, enabling a clock signal means the clock signal is permitted to propagate, whereas, disabling the clock signal means the clock signal is not permitted to propagate. Clock gating cells, or clock gating circuits, are used to gate, or enable/disable, particular clock signals. Clock gating cells may also be referred to as clock gaters.

Although multi-bit clock gating circuit 100 uses active high latches 120-124, in other embodiments, multi-bit clock gating circuit 100 uses active low latches. Each one of the latches 120-124 conveys a respective one of the received signals EnableIn1 110, EnableIn2 112, and EnableInN 114 responsive to determining the shared intermediate clock signal 104 is asserted. Therefore, each one of the output control signals EnableOut1 130, EnableOut2 132, and EnableOutN 134 has a same value as a respective one of the received signals EnableIn1 110, EnableIn2 112, and EnableInN 114. In various embodiments, there may be a propagation delay from the input enable signal to the output enable signal. When the clock input to the latches is high (in an active high latch), the latches 120-124 are considered to be "open" and the data value appearing on the data input (D) to the latch is passed through to the output of the latch (Q). However, if the clock input on a latch is low, each one of the latches 120-124 conveys a current state (Q) of the latch which does not change in response to changes in the received signals EnableIn1 110, EnableIn2 112, and EnableInN 114. In this case, the latches 120-124 are considered to be "closed" and the output of the latch represents the most recent value that was latched by the latch.

As used herein, when a value reaches a state for enabling evaluation, the value is determined to be asserted. In the above example, the shared intermediate clock signal 104 having a logic high value permits each of the latches 120-124 to be "open" and enables the circuitry in the latches 120-124 to generate a new output value. In such a case, the value of the shared intermediate clock signal 104 on the clock node of the latches 120-124 is determined to be asserted. The logic high value is used as the state in this case to qualify the shared intermediate clock signal 104 as being asserted. In contrast, when the shared intermediate clock signal 104 has a logic low value, each of the latches 120-124 is considered to be "closed" disables the circuitry in the latches 120-124 to generate a new output value. In such a case, the value of the shared intermediate clock signal 104 on the clock node of the latches 120-124 is determined to be low.

In the illustrated embodiment, multi-bit clock gating circuit 100 includes circuitry (e.g., Boolean gates) 140, 142 and 144. As shown, each of the gates 140, 142 and 144 is a Boolean AND gate used to generate the gated clock signals OutClock1 150, OutClock2 152 and OutClockN 154. Each of the gates 140, 142 and 144 combines a respective one of the output control signals EnableOut1 130, EnableOut2 132, and EnableOutN 134 with the received single common clock signal 102. Accordingly, each one of the gates 140, 142 and 144 conveys a respective one of the received signals EnableOut1 130, EnableOut2 132, and EnableOutN 134 as the generated outputs OutClock1 150, OutClock2 152 and OutClockN 154 responsive to determining the received single common clock signal 102 is high. In contrast, each one of the gates 140, 142 and 144 conveys a low value as the generated outputs OutClock1 150, OutClock2 152 and OutClockN 154 responsive to determining the received single common clock signal 102 is low. In the illustrated embodiment, the given value is a logic low value. In some embodiments, one or more inverters are placed after the gates 140, 142 and 144 to help drive the outputs OutClock1 150, OutClock2 152 and OutClockN 154.

In some embodiments, each one of the gates 140, 142 and 144 has a similar size and a similar drive strength for driving gated clocks signals for a given clock load. In other embodiments, one or more of the gates 140, 142 and 144 has a different size, and thus, a different drive strength from other gates of the gates 140, 142 and 144. In an embodiment, the logic definition of multi-bit clock gating circuit 100 is used by multiple library cells, each with different physical characteristics from one another.

As noted above, in some embodiments, multi-bit clock gating circuit 100 may use active low latches instead of active high latches 120-124. In such an embodiment, a non-inverted version of the input clock 102 is conveyed to the active low latches instead of the inverted clock signal 104. In such embodiments, if desired, a non-inverting buffer may be used to distribute the received clock signal 102 to the active low latches. In various embodiments, multi-bit clock gating circuit 100 includes one or more Boolean logic gates (not shown). In various embodiments, the one or more Boolean logic gates may be placed within the latches 120-124, at the data input of the latches 120-124, or otherwise. In some embodiments, the one or more Boolean logic gates are placed between one or more received enable signals and the data input of the latches 120-124. The one or more Boolean logic gates combine multiple different enable signals within the multi-bit clock gating circuit 100.

Figure 2:
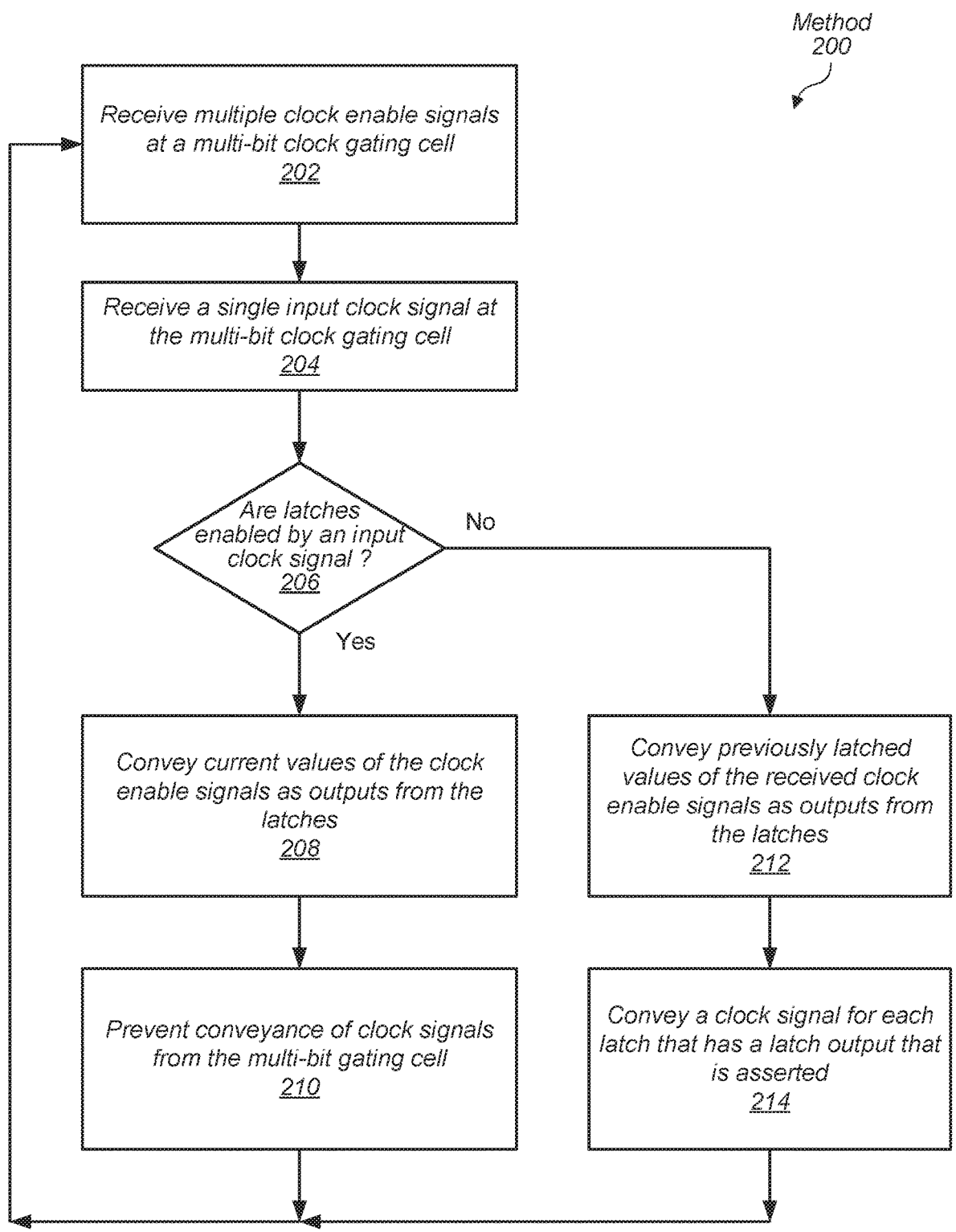
FIG. 2 is a flow diagram of one embodiment of a method for efficiently generating multiple gated clock signals from a common single clock signal.

Referring to FIG. 2, one embodiment of a method 200 for efficiently generating multiple gated clock signals from a common single clock signal is shown. In the example shown, a circuit similar to that shown in FIG. 1 with active high latches is assumed. Also assumed is an inverter 106 to create an inverted version of a received clock signal 102. However, as discussed above, those skilled in the art will appreciate that active low latches could be used instead with suitable adjustments. For purposes of discussion, the steps in this embodiment are shown in sequential order. It should be noted that in various embodiments of the method described below (similarly for FIG. 6), one or more of the elements described may be performed concurrently, in a different order than shown, or may be omitted entirely. Other additional elements may also be performed as desired. Any of the various systems and/or apparatuses described herein may be configured to implement method 200. For example, in one embodiment, the multi-bit clock gating circuit 100 (of FIG. 1) utilizes the steps described in method 200.

In various embodiments, a multi-bit clock gating cell receives multiple clock enable signals (block 202). In addition, the multi-bit clock gating cell receives a single input clock signal (block 204). If the latches are enabled by a received clock signal (e.g., an inverted version of a received clock signal is high) ("yes" branch of the conditional block 206), then values of the clock enable signals received by the cell are conveyed as outputs from the latches (block 208). These values are combined with the single shared input clock signal by one or more Boolean logic gates (logic "AND" gates in the example of FIG. 1). As the logic gates in this case receive a low value from the received clock signal, each of these gates conveys a logic low value irrespective of a value of the corresponding clock enable signal. For those logic gates receiving an asserted clock enable signal, the low output from the logic gate is equivalent to the low value of the clock signal and could be viewed as conveying the received clock signal. Conversely, for those logic gates receiving a negated clock enable signal, the logic gate may generally be viewed as blocking conveyance of the clock signal even though the output from the gate is equivalent to the received clock signal at that point in time (block 210).

On the other hand, if the latches of the cell are not enabled by the received input clock signal ("no" branch of the conditional block 206), then the most recent value latched by each of the latches represents the current state of the latch and is conveyed as an output of the latch (block 212). These values are then combined with the single input clock signal by one or more Boolean logic gates (logic "AND" gates in the example shown). Since the input clock signal is high in this case, the input clock signal is conveyed from the cell as the multiple output clock signals for those output clock signals that have a corresponding enable signal that is asserted (block 214).

Figure 3:
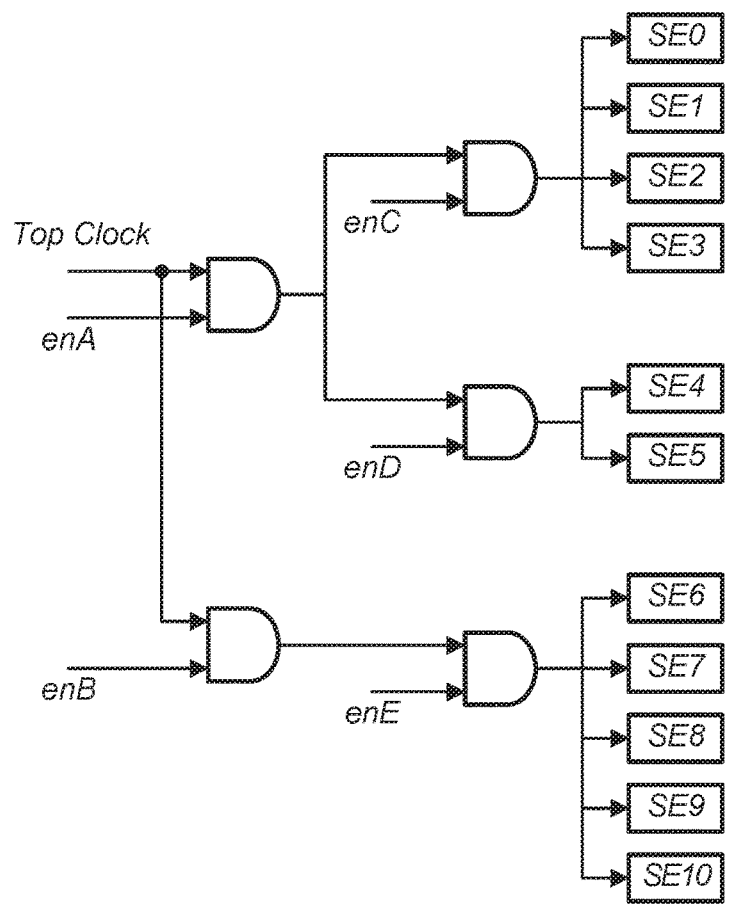
FIG. 3 is a block diagram of one embodiment of a clock tree during pre-clock tree synthesis.
Figure 3:
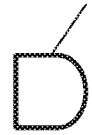
Figure 3:

Turning now to FIG. 3, a generalized block diagram illustrating one embodiment of a clock tree hierarchy 300 during pre-clock tree synthesis is shown. In an embodiment, the clock tree hierarchy 300 is a subset of a larger clock tree for an integrated circuit. The integrated circuit may use one of a variety of clock tree hierarchies such as an H-tree, a Fish-bone-tree, Y-trees, a matched resistor-capacitor (RC) tree, a combination of multiple trees, or other. As shown, the clock tree hierarchy 300 includes multiple copies of a single-bit clock gater 310 for supplying clock signals to multiple instances of sequential elements (SE) 320. As described earlier, examples of sequential elements are flip-flop circuits, latch circuits, write wordline driver circuits, read wordline driver circuits, and so forth. In an embodiment, each of the single-bit clock gaters is placed in a floorplan based on the selected clock tree topology and the load being driven by the single-bit clock gater.

As shown, a common clock is received, which is referred to as Top Clock. In addition, five clock enable signals are used for generating gated clock signals based on Top Clock or another gated clock signal. The five clock enable signals are labeled as enA, enB, enC, enD and enE. A single-bit clock gater receives the clock enable signal enA and Top Clock, and generates a gated clock output to two other single-bit clock gaters. Another single-bit clock gater receives the clock enable signal enB and Top Clock, and generates a gated clock output to one other single-bit clock gater.

A single-bit clock gater, which receives the clock enable signal enC, drives a load of four sequential elements labeled as SE0, SE1, SE2 and SE3. Another single-bit clock gater receives the clock enable signal enD and drives a load of two sequential elements labeled as SE4 and SE5. A third single-bit clock gater receives the clock enable signal enE and drives a load of five sequential elements labeled as SE6, SE7, SE8, SE9 and SE10. For purposes of discussion, each of the sequential elements SE0 to SE10 has a relatively similar clock load.

The total clock load for the single-bit clock gaters also includes the length of the clock signal routes, the parasitic capacitance on the clock signal routes, and the pin capacitance of the clock pin of the sequential elements. For purposes of discussion, the total clock load is assumed to be approximately equal to the number of sequential elements being driven. In an embodiment, none of the clock signal routes are actually routed with wires yet as this design stage is a pre-clock tree synthesis (pre-CTS) stage. Rather, the sequential elements SE0 to SE10 are placed in the floorplan, the five single-bit clock gaters are placed in the floorplan in an unconstrained location such as relatively close to a respective clock enable signal fan-in cone.

In the illustrated embodiment, one or more of the single-bit clock gaters in the pre-CTS design stage may be cloned due to driving a relatively large clock load. For example, a load threshold for cloning a single-bit clock gater may be four sequential elements. Therefore, the single-bit clock gater receiving the clock enable signal enD would not be cloned. However, the other two single-bit clock gaters may be cloned due to driving clock loads larger than the load threshold.

Figure 4:
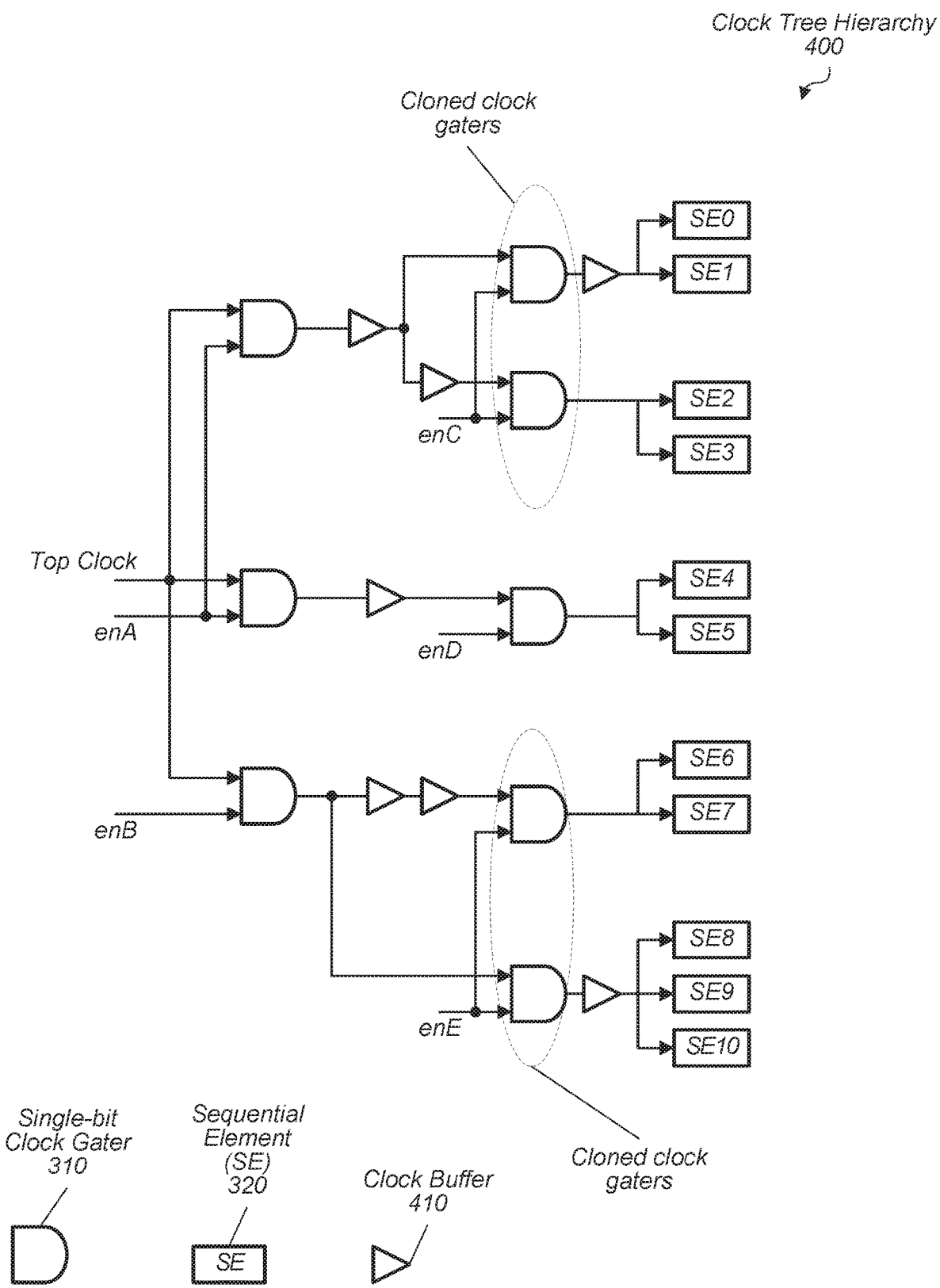
FIG. 4 is a block diagram of one embodiment of a clock tree during post-clock tree synthesis.

Referring now to FIG. 4, a generalized block diagram illustrating one embodiment of a clock tree during post-clock tree synthesis 400 is shown. Circuitry and logic already described are numbered identically and signals already described are labelled identically. In the illustrated embodiment, the current design stage is a post-clock tree synthesis (post-CTS) stage. Accordingly, any qualifying single-bit clock gaters are cloned to reduce the clock load for any given single-bit clock gater.

As shown, the single-bit clock gater (of FIG. 3) previously receiving the clock enable signal enC is cloned, and now two single-bit clock gaters are used to drive the load of the four sequential elements SE0 to SE3. Similarly, the single-bit clock gater (of FIG. 3) previously receiving the clock enable signal enE is cloned, and now two single-bit clock gaters are used to drive the load of the five sequential elements SE6 to SE10. The amount of cloning, or replicating, of the single-bit clock gaters is based on the clock load to drive. Parameters to consider when computing a clock load for a single-bit clock gater include at least pin capacitance, the number of receivers (sequential elements) being driven and spatial location of the receivers.

In an embodiment, the single-bit clock gaters are placed in the floorplan relatively close to a midpoint or center of the receiver locations. The midpoint may be based on the number of sequential elements, the capacitance load of each sequential element, or a combination. In one embodiment, clock signal wires are routed with non-default routing rules such as extra width and/or spacing and/or shielding. In various embodiments, one or more clock buffers 410 are also inserted based on loading and placement of receivers.

In an embodiment, each clock buffer is an odd number of inverters and generates an inverting value with respect to a received clock signal. In another embodiment, each clock buffer is an even number of inverters and generates a non-inverting value with respect to a received clock signal. In various embodiments, two or more of the single-bit clock gaters are replaced with a multi-bit clock gater. Parameters to consider for replacement include distance between two single-bit clock gaters receiving a common clock signal, clock load being driven by the single-bit clock gaters, routing congestion, an activity level of the common clock signal, and so forth. In some embodiments, cloned single-bit clock gater are not candidates for replacement by a multi-bit clock gater. In other embodiments, cloned single-bit clock gater are candidates for replacement by a multi-bit clock gater.

Figure 5:
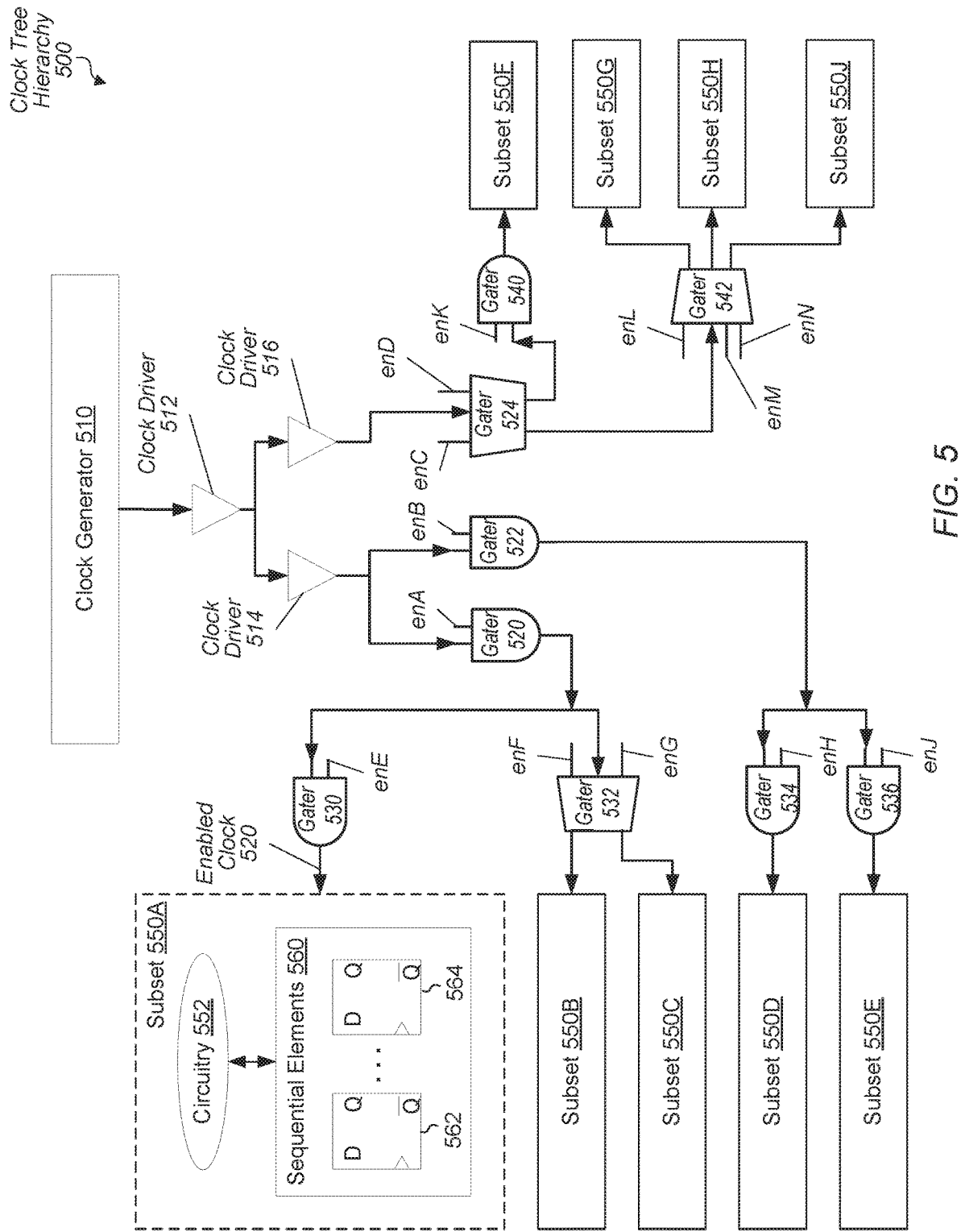
FIG. 5 is a block diagram of one embodiment of a clock tree hierarchy.

Turning now to FIG. 5, a generalized block diagram illustrating one embodiment of a clock tree hierarchy 500 is shown. The number of levels of the clock tree hierarchy 500 is for illustrative purposes only. In other embodiments, any number of hierarchy levels may be used based on the design of the integrated circuit and the topology of the selected clock tree. In an embodiment, clock generator 510 uses an external clock source as a reference clock signal such as a crystal oscillator, a phase-locked loop (PLL), or other. Clock generator 510 may be a PLL, a clock multiplier, or other.

One or more unconditional clock buffers propagate clock signals across the die of the integrated circuit such as clock drivers 512, 514 and 516. At a selected level of the clock tree hierarchy, gated clock signals are used. As shown, the clock tree hierarchy 500 receives clock enable signals across the die labelled as enA to enN. As described earlier, in one embodiment, the clock enable signals are received from a power management unit. Clock gating circuits, or clock gaters, are distributed across the die of the integrated circuit. As shown, clock gaters 520-542 are used by clock tree hierarchy 500 for providing multiple gated clock signals to other clock gaters and to each of the subsets 550A-550J. Each of the subsets 550A-550J include at least multiple sequential elements in a subset of the total number of sequential elements on the die. In various embodiments, two or more of the subsets 550A-550J are in a same region on the die. In some embodiments, one or more subsets 550A-550J are alone in a region on the die. In some embodiments, one or more of subsets 550A-550J are differentiated from one another based on logical differences in respective enable signals. In other embodiments, one or more of subsets 550A-550J are differentiated from one another based on the use of cloning of respective clock gating circuits to redistribute and reduce clock loading for the respective clock gating circuits.

As shown, each of the subsets 550A-550J include circuitry 552 and sequential elements 560. Although sequential elements 562 and 564 are shown as flip-flop circuits, this is for illustrative purposes and the sequential elements 562 may one of flip-flop circuits, latch circuits, write wordline driver circuits, read wordline driver circuits, and so forth. In some embodiments, each of the subsets 550A-550J consumes a relatively equal amount of on-die area. In other embodiments, one or more of the subsets 550A-550J consume a different amount of on-die area than other subsets.

In the illustrated embodiment, clock tree hierarchy 500 uses both single-bit clock gaters and multi-bit clock gaters. The single-bit clock gaters are shown as Boolean AND gates, whereas the multi-bit clock gaters are shown as trapezoids. For example, clock gaters 520, 522, 530, 534, 536 and 540 are single-bit clock gaters. Clock gaters 524, 532 and 542 are multi-bit clock gaters. Each of the multi-bit clock gaters 524, 532 and 542 generate multiple gated clock output signals based on a single clock input signal and multiple received clock enable control signals.

In some embodiments, the replacement of single-bit clock gaters with multi-bit clock gaters is done during pre-CTS steps, whereas, in other embodiments, the replacement is done during post-CTS steps. If replacement is performed during pre-CTS design steps, then the load threshold used for comparing against the clock load of single-bit clock gaters is adjusted based on possible cloning of single-bit clock gaters. If the load threshold is not adjusted, then designers or a software tool may accidentally replace a given single-bit clock gater with a multi-bit clock gater when the given single-bit clock gater should be cloned due to driving a relatively large clock load or driving a relatively wide placement of sequential elements. If replacement is performed during post-CTS design steps, then replacement should be done prior to clock tree routing.

Parameters to consider for replacement include distance between two single-bit clock gaters receiving a common clock signal, clock load being driven by the single-bit clock gaters, routing congestion, an activity level of the common clock signal, and so forth. In some embodiments, cloned single-bit clock gater are not candidates for replacement by a multi-bit clock gater. In other embodiments, cloned single-bit clock gater are candidates for replacement by a multi-bit clock gater.

Figure 6:
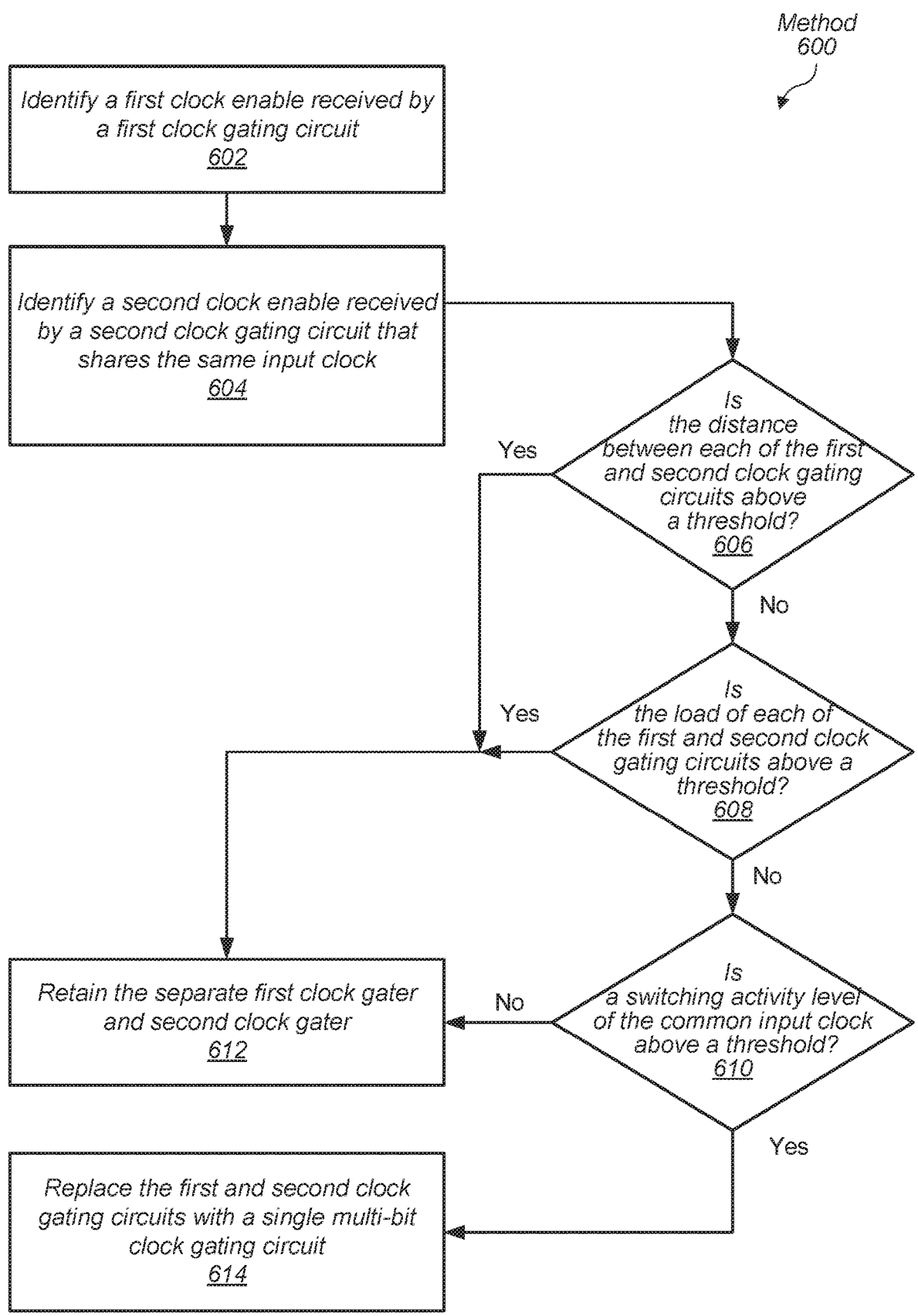
FIG. 6 is a flow diagram of one embodiment of a method for placing single-bit clock gating cells and multi-bit clock gating cells in a floorplan.

Referring to FIG. 6, one embodiment of a method 600 for placing single-bit clock gating cells and multi-bit clock gating cells in a floorplan is shown. A first clock enable received by a first clock gater is identified at a given level of the clock tree hierarchy (block 602). In some embodiments, a designer identifies the first clock enable. In other embodiments, a software tool, such as a clock synthesis tool, identifies the first clock enable. A second clock enable received by a second clock gater and sharing a same input clock as at the first clock gater is identified at the given level of the clock tree hierarchy (block 604).

If the distance between each of the first clock gater and the second clock gater is above a distance threshold ("no" branch of the conditional block 606), then the first clock gater and the second clock gater are used separately in the clock tree hierarchy (block 612). If the distance between each of the first and the second clock gater is below the distance threshold ("yes" branch of the conditional block 606), but the load of at least one of the first clock gater and the second clock gater is above a load threshold ("no" branch of the conditional block 608), then control flow of method 600 moves to block 612 where the first clock gater and the second clock gater are used separately in the clock tree hierarchy. In such a case, in some embodiments, the one of the first clock gater and the second clock gater driving a load above a load threshold is a candidate for cloning. In other embodiments, cloning is performed prior to determining where to use multi-bit clock gating cells, and the loads of single bit clock gaters are already below the load threshold. Further details are provided below regarding distance and clock loading.

In some embodiments, the distance between the first clock gater and the second clock gater is measured by a half perimeter distance using the horizontal distance and the vertical distance between the two gaters. In other embodiments, an MST (minimum spanning tree) length or Steiner estimate length is used to determine the distance. In yet other embodiments, the actual route length of the shared input clock from a point of divergence to the first clock gater and from the point of divergence to the second clock gater is used to determine the distance. In an embodiment, the threshold is set based on the choice of measurement and an estimated timing effect on one or more of clock signal latency, clock slew rate and clock skew. The timing effects are based on placement of the multi-bit clock gating cell used to replace the first clock gater and the second clock gater.

In some embodiments, the placement is estimated to be mid-way between the first clock gater and the second clock gater. In one embodiment, a table is used to relate certain distances from a placed multi-bit clock gating cell and the farthest clock load to be driven by the multi-bit clock gating cell. In an embodiment, the table is generated from simulations using a resistance and capacitance model to estimate change in interconnect delay. In some cases, the farthest distance is half of the distance between the first clock gater and the second clock gater. In other cases, the farthest distance is more and it is determined by another placement of the multi-bit clock gating cell based on the placement of other blocks on the die. In one embodiment, the table is indexed by a measured distance and the resulting clock latency, clock slew rate and clock skew are read out and compared to corresponding thresholds. In another embodiment, the simulations are performed after determining the distance and then the resulting clock latency, clock slew rate and clock skew are determined and compared to thresholds.

In one embodiment, when comparing clock loads to a load threshold during pre-CTS steps, one or more of the single-bit clock gating cells (clock gaters) may be later cloned to reduce a relatively high load to be driven. If the load threshold used for determining whether to clone is known, then the load threshold used for determining whether to replace single-bit clock gating cells with multi-bit clock gating cells are adjusted accordingly. In another embodiment, single-bit clock gating cells identified for cloning are removed as candidates for being replaced by multi-bit clock gating cells. In yet other embodiments, determining whether to replace single-bit clock gating cells with multi-bit clock gating cells is performed only during post-CTS steps and the load thresholds for cloned single-bit clock gating cells and non-cloned single-bit clock gating cells in the floorplan are known and do not need to be adjusted.

If the load of each of the first clock gater and the second clock gater is below the load threshold ("yes" branch of the conditional block 608), but a switching activity level of the common input clock is below a switching activity threshold ("no" branch of the conditional block 610), then control flow of method 600 moves to block 612 where the first clock gater and the second clock gater are used separately in the clock tree hierarchy. In some embodiments, the switching activity levels are generated for clock nets (signals) across the die based on design simulations provided by one or more a transistor-level characterizing software tool and a hardware description language (HDL) tool suite, which bundles a text editor and waveform viewer, and utilizes RTL-level (register transfer language level) software. However, if the activity level of the common input clock is above the switching activity threshold ("yes" branch of the conditional block 610), then the first clock enable and the second clock enable are combined with the common input clock in a multi-bit clock gating cell at the given level of the clock tree hierarchy (block 614). The first clock gater and the second clock gater are replaced with the multi-bit clock gating cell. In some embodiments, the switching activity threshold is set to zero in order to use multi-bit clock gating cells as frequently as possible. In other embodiments, a switching power value is calculated for single-bit clock gaters based on the activity level of a received common clock signal and a clock load to drive. In an embodiment, the single-bit clock gaters with a switching power value above a threshold are candidates for being replaced by a multi-bit clock gating cell.

In other embodiments, other conditions are also checked for qualifying single-bit clock gaters as candidates for being replaced by a multi-bit clock gating cell. One additional condition is whether a particular single-bit clock gater is a cloned clock gater. In some embodiments, cloned clock gaters are not candidates, whereas in other embodiments, cloned clock gaters qualify to be candidates. As described earlier, if the load threshold used for determining whether to clone is known, then the load threshold used for determining whether to replace single-bit clock gating cells with multi-bit clock gating cells are adjusted accordingly. A second additional condition is routing congestion. One or more software tools are used to indicate metal track usage on a given metal layer, which is used to determine a percentage of metal utilization of the given metal layer in particular areas on the die. Therefore, the metal utilization in a location selected for a candidate multi-bit clock gating cell can be determined. If the metal utilization of the layer used for routing clock signals exceeds a threshold in the selected location, then the multi-bit clock gating cell is not placed in the selected location. The multi-bit clock gating cell will increase the metal utilization with the multiple clock signals conveyed from the cell. Additionally, in some embodiments, cell placement density is considered in a similar manner.

Figure 7:
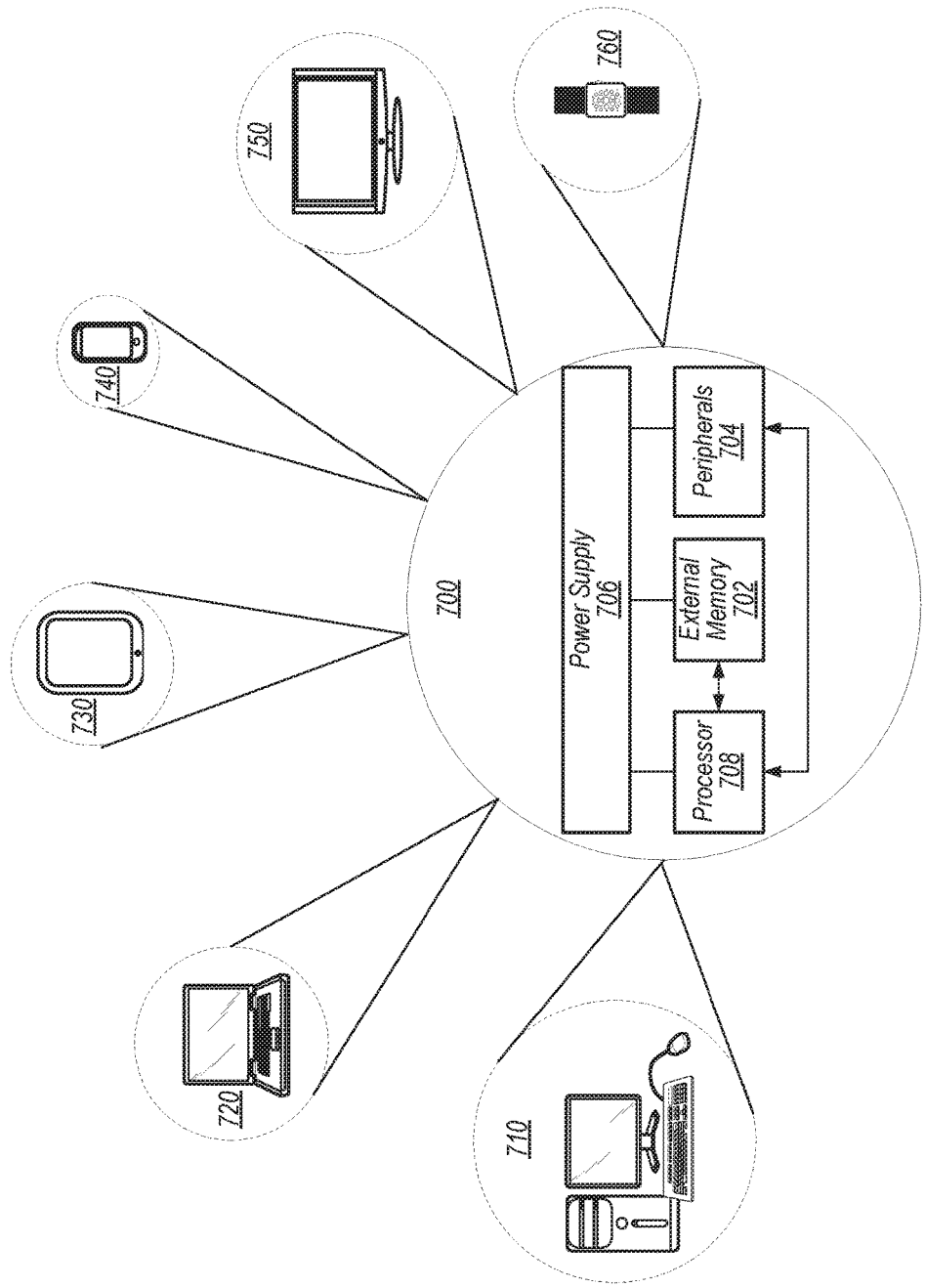
FIG. 7 is a block diagram of one embodiment of a system.

Turning next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least one instance of processor 708 which includes one or more multi-bit clock gaters. Processor 708 is coupled to an external memory 702. In various embodiments, processor 708 may be included within a system on chip (SoC) or integrated circuit (IC) which is coupled to external memory 702, peripherals 704, and power supply 706.

Processor 708 is coupled to one or more peripherals 704 and the external memory 702. A power supply 706 is also provided which supplies the supply voltages to processor 708 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of processor 708 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with a SoC or IC containing processor 100 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A clock gating circuit comprising:
   circuitry configured to receive a single input clock signal;
   a plurality of latches, each configured to:
      receive one of a plurality of clock enable signals;
      receive a clock signal corresponding to the single input clock signal; and
      generate one of a plurality of control signals; and
   a plurality of clock buffers, each configured to:
      generate a different output clock signal based on the input clock signal and a different one of the plurality of control signals; and
      send one or more of the different output clock signals to one or more external clock buffers.

2. The clock gating circuit as recited in claim 1, wherein each of the plurality of latches is an active high latch, and the clock signal corresponding to the single input clock signal is an inverted version of the single input clock signal.

3. The clock gating circuit as recited in claim 2, wherein to generate the one of a plurality of control signals, each of the clock buffers is configured to:
   convey a current state of a received clock enable signal as a control signal, in response to determining the clock signal corresponding to the single input clock signal is high; and
   convey a previously latched state of a received clock enable signal as a control signal, in response to determining the clock signal corresponding to the single input clock signal is low.

4. The clock gating circuit as recited in claim 1, wherein each of the plurality of latches is an active low latch, and the clock signal corresponding to the single input clock signal is a non-inverted version of the single input clock signal.

5. The clock gating circuit as recited in claim 4, wherein to generate the one of a plurality of control signals, each of the clock buffers is configured to:
   convey a current state of a received clock enable signal as a control signal, in response to determining the clock signal corresponding to the single input clock signal is low; and
   convey a previously latched state of a received clock enable signal as a control signal, in response to determining the clock signal corresponding to the single input clock signal is high.

6. The clock gating circuit as recited in claim 1, wherein:
   at least one of the plurality of clock buffers has a drive strength different from drive strengths of other clock buffers of the plurality of clock buffers; and
   at least one of the one or more external clock buffers is a conditional clock buffer receiving a plurality of enable signals.

7. The clock gating circuit as recited in claim 1, wherein to generate a different output clock signal based on the input clock signal and a different one of the plurality of control signals, each of the clock buffers is configured to perform a logical operation on the input clock signal and a different one of the plurality of control signals.

8. A method comprising:
   identifying a first clock enable signal received by a first single-bit clock gating cell at a given level of a clock tree hierarchy of an integrated circuit;
   identifying a second clock enable signal received by a second single-bit clock gating cell at the given level of the clock tree hierarchy;
   in response to determining a distance between the first single-bit clock gating cell and the second single-bit clock gating cell exceeds a distance threshold, using the first single-bit clock gating cell and the second single-bit clock gating cell in the integrated circuit; and
   in response to determining the distance is below the distance threshold:
      replacing the first single-bit clock gating cell and the second single-bit clock gating cell with a multi-bit clock gating cell in the integrated circuit; and
      combining the first clock enable signal and the second clock enable signal with a single common clock signal in the multi-bit clock gating cell.

9. The method as recited in claim 8, further comprising:
   using the first single-bit clock gating cell and the second single-bit clock gating cell, in further response to determining one or more of a first load driven by the first single-bit clock gating cell and a second load driven by the second single-bit clock gating cell exceeds a load threshold; and
   combining the first clock enable signal and the second clock enable signal with the single common clock signal in the multi-bit clock gating cell, in further response to determining each of the first load and the second load is below the load threshold.

10. The method as recited in claim 9, further comprising:
   comparing each of the first load and the second load to a first load threshold, in response to detecting the integrated circuit does not comprise any cloned single-bit clock gating cells; and
   comparing each of the first load and the second load to a second load threshold greater than the first load threshold, in response to detecting the integrated circuit comprises one or more cloned single-bit clock gating cells.

11. The method as recited in claim 8, further comprising:
using the first single-bit clock gating cell and the second single-bit clock gating cell, in further response to determining an input clock signal received by first single-bit clock gating cell is not received by the second single-bit clock gating cell; and
combining the first clock enable signal and the second clock enable signal with the single common clock signal in the multi-bit clock gating cell, in further response to determining each of the first single-bit clock gating cell and the second single-bit clock gating cell receive a shared input clock signal.

12. The method as recited in claim 11, further comprising:
using the first clock gating cell and the second clock gating cell, in further response to determining an activity level of the shared input clock signal is above an activity threshold; and
combining the first clock enable signal and the second clock enable signal with the single common clock signal in the multi-bit clock gating cell, in further response to determining the activity level of the shared input clock signal is above an activity threshold.

13. The method as recited in claim 12, further comprising maintaining one or more values at each level of the clock tree hierarchy for determining whether to use a multi-bit clock gating cell, wherein the one or more values comprise one or more of:
a distance threshold for comparing to distances between two single-bit clock gating cells; and
a load threshold for comparing to a load driven by a single-bit clock gating cell.

14. The method as recited in claim 12, further comprising maintaining one or more values at each level of the clock tree hierarchy for determining whether to use a multi-bit clock gating cell, wherein the one or more values comprises one or more of:
an activity threshold for comparing to an activity of an input clock signal received by a single-bit clock gating cell; and
a routing congestion threshold for comparing to measured routing congestion for at least an input clock signal received by a single-bit clock gating cell.

15. A system for generating a layout of an integrated circuit, the system comprising:
a processor; and
a non-transitory computer readable storage medium comprising program instructions operable to place and route clock gating circuits in an integrated circuit, wherein the program instructions when executed by the processor cause the system to:
identify a first clock enable signal received by a first single-bit clock gating cell at a given level of a clock tree hierarchy of an integrated circuit;
identify a second clock enable signal received by a second single-bit clock gating cell at the given level of the clock tree hierarchy;
in response to determining a distance between the first single-bit clock gating cell and the second single-bit clock gating cell exceeds a distance threshold, use the first single-bit clock gating cell and the second single-bit clock gating cell in the integrated circuit; and
in response to determining at least the distance is below the distance threshold:
replace the first single-bit clock gating cell and the second single-bit clock gating cell with a multi-bit clock gating cell in the integrated circuit; and
combine the first clock enable signal and the second clock enable signal with a single common clock signal in the multi-bit clock gating cell.

16. The system as recited in claim 15, wherein the program instructions are further executable by a processor to:
use the first single-bit clock gating cell and the second single-bit clock gating cell, in further response to determining one or more of a first load driven by the first single-bit clock gating cell and a second load driven by the second single-bit clock gating cell exceeds a load threshold; and
combine the first clock enable signal and the second clock enable signal with the single common clock signal in the multi-bit clock gating cell, in further response to determining each of the first load and the second load is below the load threshold.

17. The system as recited in claim 16, wherein the program instructions are further executable by a processor to:
compare each of the first load and the second load to a first load threshold, in response to detecting the integrated circuit does not comprise any cloned single-bit clock gating cells; and
compare each of the first load and the second load to a second load threshold greater than the first load threshold, in response to detecting the integrated circuit comprises one or more cloned single-bit clock gating cells.

18. The system as recited in claim 15, wherein the program instructions are further executable by a processor to:
use the first single-bit clock gating cell and the second single-bit clock gating cell, in further response to determining an input clock signal received by first single-bit clock gating cell is not received by the second single-bit clock gating cell; and
combine the first clock enable signal and the second clock enable signal with the single common clock signal in the multi-bit clock gating cell, in further response to determining each of the first single-bit clock gating cell and the second single-bit clock gating cell receive a shared input clock signal.

19. The system as recited in claim 18, wherein the program instructions are further executable by a processor to:
use the first clock gating cell and the second clock gating cell, in further response to determining an activity level of the shared input clock signal is above an activity threshold; and
combine the first clock enable signal and the second clock enable signal with the single common clock signal in the multi-bit clock gating cell, in further response to determining the activity level of the shared input clock signal is above an activity threshold.

20. The system as recited in claim 19, wherein the program instructions are further executable by a processor to maintain one or more values at each level of the clock tree hierarchy for determining whether to use a multi-bit clock gating cell, wherein the one or more values comprise one or more of:
a distance threshold for comparing to distances between two single-bit clock gating cells; and a load threshold for comparing to a load driven by a single-bit clock gating cell.

\* \* \* \* \*